United States Patent [19]
Goff et al.

[11] Patent Number: 5,303,541
[45] Date of Patent: Apr. 19, 1994

[54] CLOSED LOOP FUEL CONTROL METHOD

[75] Inventors: Edward R. Goff, Phoenix; Dennis L. Cannon, Scottsdale, both of Ariz.

[73] Assignee: AlliedSignal Inc., Morris Township, Morris County, N.J.

[21] Appl. No.: 29,094

[22] Filed: Mar. 10, 1993

Related U.S. Application Data

[62] Division of Ser. No. 776,532, Oct. 11, 1991.

[51] Int. Cl.⁵ .............................. F02C 7/26; F02C 9/28
[52] U.S. Cl. .................................................... 60/39.03
[58] Field of Search ................ 60/39.03, 39.06, 39.141, 60/39.281

[56] References Cited

U.S. PATENT DOCUMENTS

| | | | |
|---|---|---|---|
| 3,381,470 | 5/1968 | Hammerstein | 60/39.281 |
| 3,738,104 | 6/1973 | Rosa | 60/39.281 |
| 4,337,615 | 7/1982 | Lacroix . | |
| 4,508,127 | 4/1985 | Thurston | 60/39.281 |
| 4,627,234 | 12/1986 | Schuh . | |
| 5,060,469 | 10/1991 | Klaass et al. . | |

FOREIGN PATENT DOCUMENTS

324633A2  7/1989  European Pat. Off. .
1404501  8/1975  United Kingdom .

OTHER PUBLICATIONS

Fink, Donald G. "Electronic Engineers' Handbook" McGraw-Hill, New York, 1775 pp. 24–14 & 24–15.

Primary Examiner—Louis J. Casaregola
Attorney, Agent, or Firm—Jerry J. Holden; James W. McFarland; Robert A. Walsh

[57] ABSTRACT

A fuel control system for accurately controlling the fuel flow rate to a gas turbine engine during the initial stages of startup is provided. The fuel control system has a novel, closed control loop that measures the actual fuel flow rate to the primary nozzles of the engine, and uses this measurement to trim the commanded fuel flow rate signal generated by preprogrammed schedules in the engine's electronic control unit. By the novel arrangement of proportional and integral controllers, the fuel control system maintains a forward path gain of unity while permitting the independent adjustment of the gain of the controllers to achieve the system stability and response necessary for quick correction of fuel flow rate errors.

8 Claims, 2 Drawing Sheets

CLOSED LOOP FUEL CONTROL METHOD

This is a division of application Ser. No. 07/776,532 filed Oct. 11, 1991.

TECHNICAL FIELD

This invention relates generally to a fuel control system and method for regulating the flow rate of fuel to a gas turbine engine during startup, and more particularly to a fuel control system having a novel feedback control loop that increases the system's accuracy by measuring the fuel flow rate to the primary nozzles and using this measurement to adjust the torque motor current to the engine's fuel control unit, until the measured flow rate equals the required flow rate.

BACKGROUND OF THE INVENTION

In addition to their traditional propulsion functions, gas turbine engines are often used as auxiliary power units (APUs) to supply mechanical, electrical, and/or pneumatic power to a wide variety of aircraft systems. For example, the APU can be used to start the main engines, supply compressed air to the aircraft's environmental control system, or provide electrical power. Historically, APU's have only been operated when the aircraft was on the ground.

Recent developments in aircraft design has witnessed the advent of twin engine aircraft capable of long distant, transoceanic flights. Examples of such aircraft are Boeing's 757, 767 and 777, currently under development, as well as Airbus' A300, A310, and A320. A disadvantage to the twin engine design is that when a main engine experiences an inflight shutdown the enormous burden of supplying the aircraft with power falls on the sole, remaining engine. Early on in the development of these aircraft, it was recognized that they would need an additional source of power while inflight. To meet this need it was proposed to start and operate the APU inflight.

A gas turbine auxiliary power unit (APU) includes in flow series arrangement a compressor, a combustor, a turbine, and a shaft coupling the turbine to the compressor. During a normal, sea level start, a starter motor applies a starting torque to the APU's shaft. As the shaft starts to rotate, air is inducted into the compressor, compressed and then discharged in the combustor. Concurrently, the APU's fuel control system feeds fuel into the combustor in accordance with a preprogrammed fuel schedule to precisely maintain the proper fuel to air ratio in the combustor. At a rotational speed of about 10 to 20 percent of the APU's operating speed, the condition in the combustor becomes such that the fuel/air mixture can be ignited. This condition is generally referred to as light-off. Should the fuel to air ratio be either too rich or too lean, light-off will not occur and the APU will experience a hung start. After light-off the start motor torque is augmented by torque from the APU's turbine. At about 50 percent of operating speed the start motor is shut off and the APU becomes self sustaining and accelerates itself to operating speed.

To start an APU at high altitude (e.g. 40,000 ft.) after the APU has become cold soaked by continuous exposure to cold ambient temperatures (e.g. −70° F.) is a much more difficult task for the APU's fuel control system. The cold temperature increases the APU's drag necessitating greater starting torque. Further, cold fuel poorly atomizes. Poor atomization combined with low air density makes it both difficult to precisely obtain the necessary fuel to air ratio to accomplish light-off, and to provide a sufficient fuel flow rate to the combustor to prevent flameout while not providing too high a fuel flow rate which may result excessive turbine inlet temperatures.

The fuel control system used on these APUs has a fuel control unit (FCU) which is typically an electromechanical fuel metering valve disposed between a fuel source and the combustor for feeding fuel to the combustor in response to signals from an electronic control unit (ECU). The ECU contains logic which generates a startup, fuel flow rate signal as a function of shaft speed, inlet pressure and temperature, and engine exhaust temperature (EGT). Included in this logic is a preprogrammed fuel flow rate schedule that specifies the fuel flow rate before lightoff. To prevent flameout or high turbine inlet temperatures after lightoff, this logic usually contains maximum and minimum fuel flow rate limits. The schedule and limits are determined in the laboratory during the development of the APU. During a startup, the ECU monitors shaft speed and EGT and sends the appropriate signals to the metering valve to maintain these parameters within set limits. Thus, in theory these fuel control systems are closed loop systems. An example of such a system is disclosed in Schuh, U.S. Pat. No. 4,627,234.

One deficiency in these prior art fuel control systems, which becomes evident when attempting a high altitude start, is that at low shaft speed and low EGT the instrumentation cannot respond quickly enough or predictably enough to detect and provide a useable signal to the ECU. So in fact at the critical stage of operation just prior to, and after lightoff, the fuel control system is really operating as an open loop system and relying entirely on its preprogrammed fuel schedule.

Another deficiency in these fuel control systems is caused by variations in the performance of different fuel control units. It is well known to those skilled in the art that some FCU's are high side FCU and others are low side FCU. A high side FCU is one that for a given input from the ECU delivers fuel faster than the programmed schedule dictates, and a low side FCU is one that for the same input delivers fuel slower than what the schedule dictates. The problem arises because the ECU also has preset maximum and minimum fuel flow limits for startup. The maximum limit protects against excessive temperatures and surge in the engine and the lower limit protects against flameout and poor fuel atomization. For a high side FCU the limits must be kept low enough to prevent high temperatures, however, for a low side FCU these limits must be kept high enough to prevent flameout. Thus, problems can arise in the field when one FCU replaces another. Importantly, during an emergency start at high altitudes having a mismatch between the FCU and the preset limits could prevent the engine from starting or could considerably damage the engine.

Accordingly, a need exists for a closed loop fuel control system that does not depend on either shaft speed or EGT to adjust the fuel flow rate to a turbine engine during startup, and whose performance is not affected by unit-to-unit variations in FCUs.

SUMMARY OF THE INVENTION

An object of the present invention is to provide a closed loop fuel control system that does not rely on shaft speed or EGT for closed loop control during the initial stages of an APU start.

Another object of the present invention is to provide a fuel control system that adjusts for variations in fuel control units.

Yet another object of the present invention is to provide a method for delivering fuel to a gas turbine engine during a high altitude start.

The present invention achieves the above-stated objects by providing a fuel control system with a flowmeter that measures the actual fuel flow being delivered to the combustor during start up. This system also contains an ECU having a closed fuel control loop that uses a signal from the flowmeter to adjust the fuel flow rate being delivered to the APU.

These and other objects, features and advantages of the present invention are specifically set forth in or will become apparent from the following detailed description of a preferred embodiment of the invention when read in conjunction with the accompanying drawing.

DESCRIPTION OF THE PREFERRED EMBODIMENT

Figure 1:
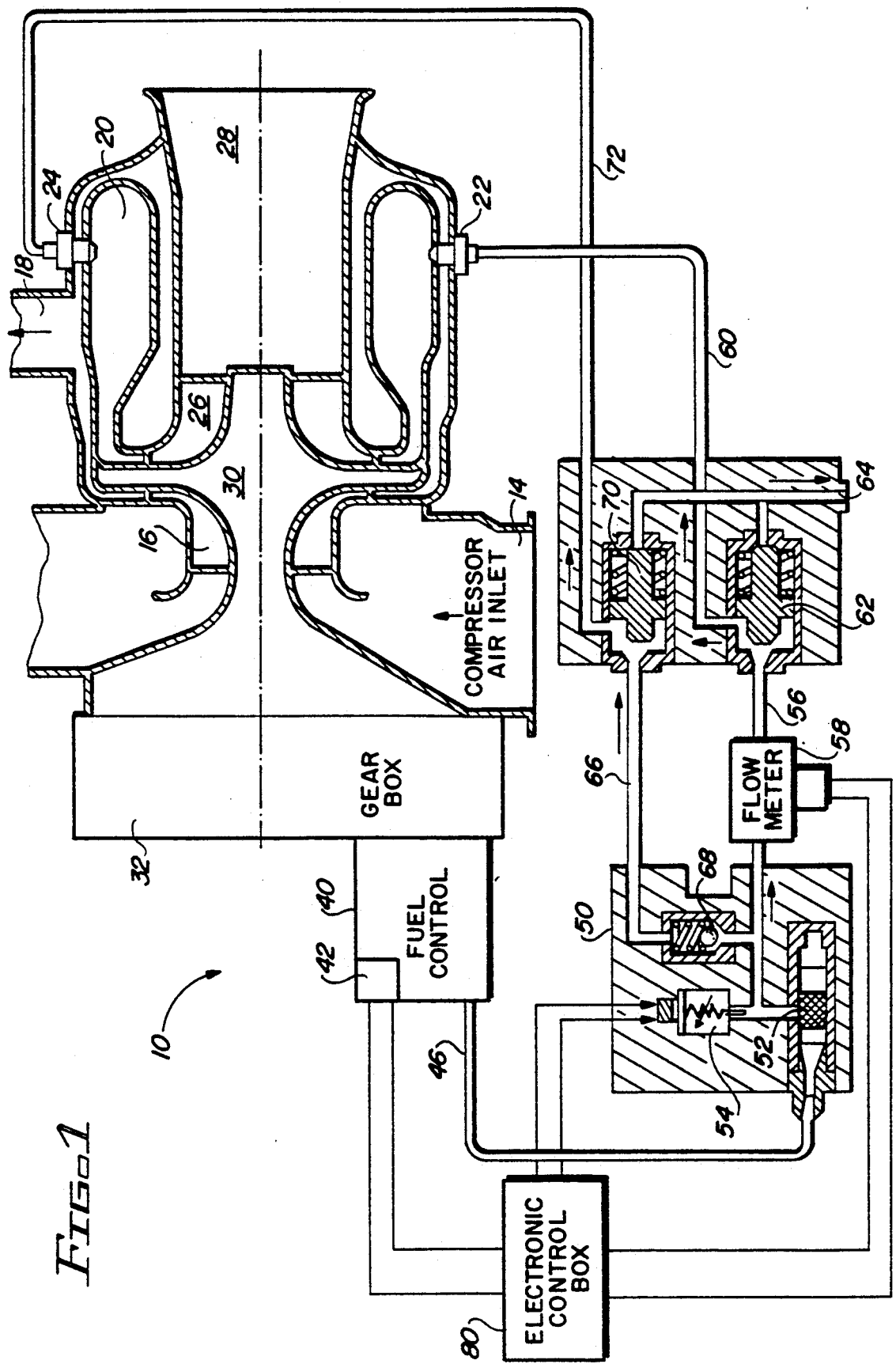
FIG. 1 is a schematic cross-section of an exemplary gas turbine auxiliary power unit in which a fuel control system embodying the principles of the present invention is incorporated.

Referring to FIG. 1, one form of an Auxiliary Power unit (APU) to which the present invention relates is generally denoted by the reference numeral 10. The APU 10 includes in flow series arrangement an air inlet 14, a compressor 16, a bleed port 18 for providing compressed air to the aircraft, a combustor 20 having a primary fuel nozzle 22 and a secondary fuel nozzle 24, a turbine 26 and an gas exhaust 28. of the two nozzles 22 and 24, only the primary nozzle 22 operates during the initial stages of a startup. The compressor 16 and the turbine 26 are mounted for rotation on a shaft 30 which extends to a gearbox 32.

Drivingly mounted to the gearbox 32 is a fuel control unit 40 in fluid communication with a fuel source, (not shown) aboard the aircraft. Preferably, the fuel control unit 40 is a single stage, electromechanical fuel metering valve of the type which is well known in the art. The fuel control unit 40 includes an electrically operated torque motor 42 which has a known and repeatable relationship with a power signal from an electronic control unit (ECU) 80 which may be analog or digital. The motor 42 is directly coupled to a metering valve, not shown, and controls the valve position so that a known flow area in the metering valve corresponds to a known power signal from the ECU 80. A regulating valve, not shown, maintains a constant pressure drop across the metering valve so that the metered flow is a direct function of the power signal. The fuel control unit 40 receives fuel from the fuel source via a high pressure fuel pump, and discharges a metered fuel flow through a conduit 46 to a flow divider 50. Other accessories, not shown, such as start motors, electrical generators and pumps can also be mounted to the gearbox 32.

The flow divider 50 includes a filter 52 through which metered fuel is received via conduit 46 and then is passed by a temperature sensor 54 which is electrically coupled to the ECU 80. Downstream of the sensor 54 the flow of fuel within the divider 50 is broken into a primary flow path 56 and a secondary flow path 66.

Fuel entering the primary flow path 56 flows through a conventional flow meter 58. The flow meter 58 measures the rate of flow passing therethrough and converts this measurement to an electrical signal which is transmitted to the ECU 80. After passing through the flow meter 58 the stream of fuel enters a conduit 60 which leads to the primary fuel nozzle 22. Disposed between the flowmeter 58 and the conduit 60 is a primary drain valve 62 which when open places the conduit 60 in fluid communication with a drain port 64 and when closed with the conduit 56.

Fuel only enters the secondary flow path 66 when its pressure is sufficient to open a start sequence valve 68. When the valve 68 is open fuel flows past a secondary drain valve 70 similar to the primary drain valve 62 and into a conduit 72 that leads to the secondary fuel nozzle 24. When the valve 70 is closed the conduit 72 is placed in fluid communication with the drain port 64.

Prior to starting the APU 10, the start sequence valve 68 is closed and the drain valves 62 and 70 are opened. Upon receiving a signal from the ECU 80, the fuel control unit 40 meters fuel from the fuel source to the divider 50 and through the primary flow path 56 wherein the primary drain valve 62 closes and fuel flows to the primary fuel nozzles 22. During this time the fuel flow in the primary flow path 56 is measured by the flow meter 58. After light-off, the fuel pressure increases until the start sequence valve 68 opens, and the secondary drain valve 70 closes, and fuel starts flowing to the secondary nozzles 24.

Figure 2:
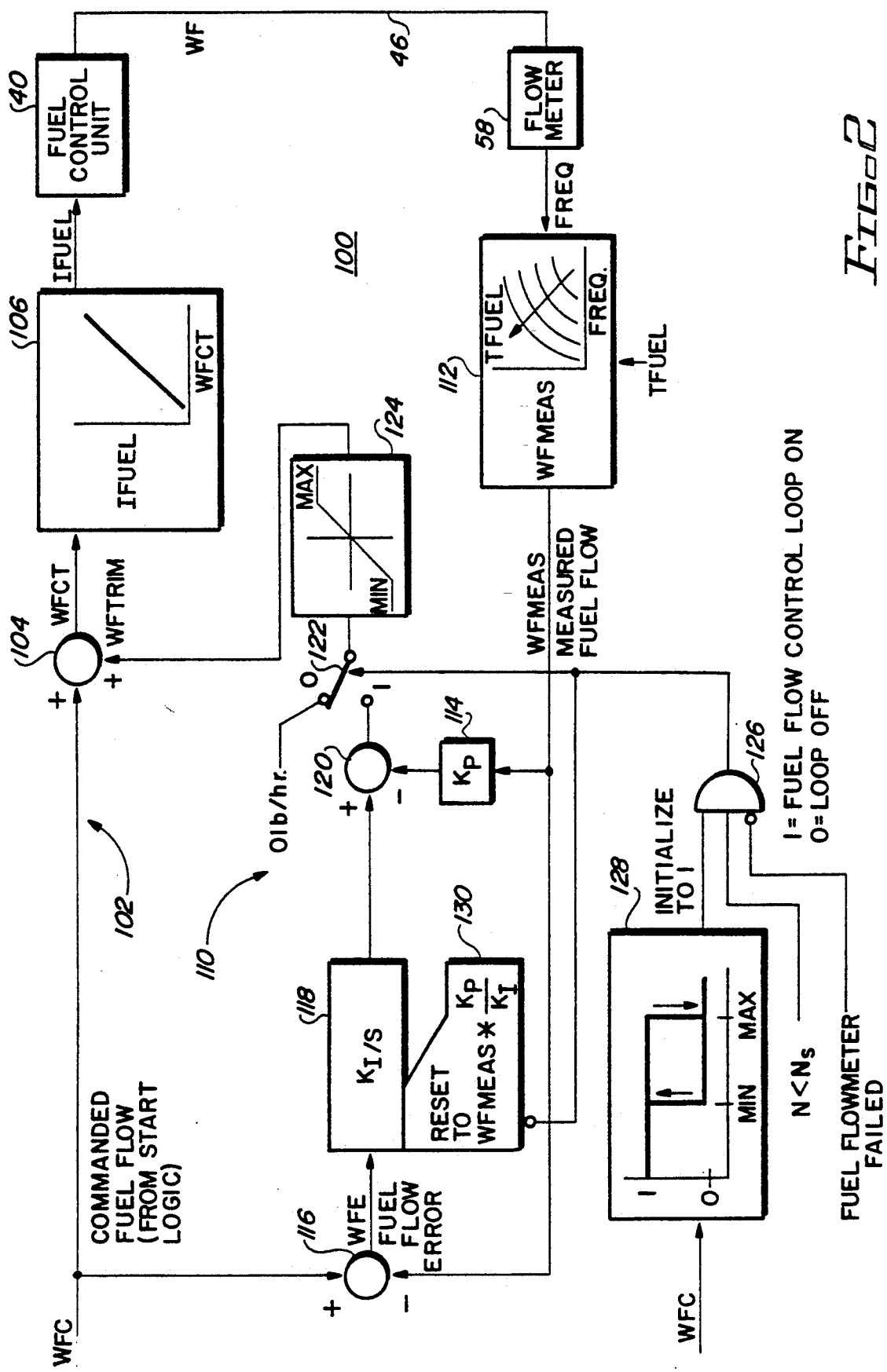
FIG. 2 is a block diagram of a fuel control loop contemplated by the present invention for use with the auxiliary power unit of FIG. 1.

The ECU 80 includes any start control logic, not shown, that can generate a commanded fuel flow signal WFC. By way of example, but not limitation, one such start control logic is the timed acceleration start logic disclosed in LaCroix, U.S. Pat. No. 4,337,615 which is incorporated by reference herein, and which is assigned to the Assignee of this application. In LaCroix a WFC signal is generated by the summing amplifier 34. A novel fuel control loop 100, illustrated in FIG. 2, is preferably also incorporated within the ECU 80.

The fuel control loop 100 has a feed forward path 102 which includes in series a summing junction 104 and a function block 106. The summing junction 104 receives the WFC signal and adds it to a fuel flow trim signal WFTRIM to generate a fuel flow corrected signal WFCT. The WFTRIM signal, which is described in greater detail below, is initialized to zero, so that initially the WFCT signal equals the WFC signal. The function block 106 receives the WFCT signal and solves the algorithim graphically depicted in FIG. 2, to generate a torque motor current IFUEL. The fuel control unit 40 receives the IFUEL signal and meters a fuel flow WF through conduit 46 to the divider 50. Ideally, WF should equal WFC. However, the algorithim in the function block 106 is preprogrammed and represents a nominal fuel control unit characteristic. As discussed previously, the actual fuel control unit may have a characteristic above or below this preprogrammed characteristic. Accordingly, the WF signal may not equal the WFC signal.

To correct for any difference between these signals during the initial stages of startup, the fuel control loop 100 includes a feedback path 110 that generates the WFTRIM signal. The feedback path 108 includes a function block 112 which receives a fuel flow signal FREQ from the flowmeter 58 which measures WF, and a fuel temperature signal TFUEL from the temperature sensor 54, and solves the lookup table graphically depicted therein to generate a measured fuel flow signal WFMEAS. The WFMEAS signal is supplied in parallel to a proportional controller 114, and to a summing junction 116 in series with an integral controller 118. The summing junction 116 combines the WFC signal with the WFMEAS signal to generate an error signal WFE equal to their difference. The WFE signal is then supplied to the controller 118. The output signals from the controllers 114 and 118 are combined in the summing junction 120 which generates the WFTRIM signal. The WFTRIM signal passes through a switch 122 and a limiter 124 before reaching the summing junction 104. The limiter 124 has preselected limits on the absolute valve of WFTRIM. Which prevents excessive turbine inlet temperatures of WFTRIM is positive and flameout if WFTRIM is negative.

By the novel arrangement of proportional controller 114, summing junction 110, and integral controller 118, the control loop 100 maintains a forward path gain of unity between the WFC signal and the WFCT signal, while still allowing independent adjustment of the gain of the controllers 114 and 118 to achieve the loop stability and fast response required to quickly correct fuel flow rate errors. Because the feed forward path 102 has unity gain, it can generate fast transient responses to changes in the WFC signal without the need for high gains or very fast flowmeters. This means that the response of the WFCT signal to the WFC signal is instantenous and is not limited by the response speed of the feedback path 110. As a result, at the low fuel flow rates experienced during the initial stages of an APU start, where conventional direct acting torque meter valve type fuel controls have poor accuracy, the accuracy between actual and commanded fuel flows is greatly increased resulting in more reliable, high altitude starting.

The switch 122 turns on the feedback path 110 during the startup of the APU 10. A signal generator 128 receives the WFC signal and generates an on or off signal, (1 for on, 0 for off as depicted in FIG. 2). The signal generator 128 generates an on signal so long as the WFC is increasing and is less than a preselected maximum value, and if WFC is decreasing, it generates an on signal when the WFC signal drops below a preselected minimum value, which is less than the maximum value. The deadspace between these values prevents the latch 122 from repeatedly switching on and off due to signal noise.

An and gate 126 receives the on/off signal from the signal generator 128, a speed signal from the APU 10, and a flowmeter failure signal from the flowmeter 58. If the signal generator 128 is generating an on signal, and the shaft speed N of the APU is less than its operating speed Ns, and the flow meter 58 is not generating a failed signal, the switch 122 will switch the feedback path 110 on. Otherwise, the switch 122 will switch the feedback path 110 off and initialize the WFTRIM signal to zero. At the same time, the controller 118 has a reset function 130, that initializes the output of controller 118 to a value that will result in the signal WFTRIM being zero when the feedback path 110 is again turned on.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A method for regulating the flow rate of fuel to a gas turbine engine during the initial stages of startup comprising the steps of:

providing a fuel flow signal, from a preselected schedule, to a function generator that generates a control signal for a fuel control unit that regulates the flow of fuel to said gas turbine engine;

measuring the actual fuel flow from said fuel control unit to said engine, and generating a signal thereof;

producing a first trim signal having a magnitude proportionally related to the magnitude of said measured signal;

combining said measured signal with said scheduled signal to form an error signal;

producing a second trim signal having a magnitude related to the integral as function of time of said error signal;

combining said first and second trim signals to form a third trim signal;

combining said third trim signal with said scheduled signal before said function generator; and repeating said previous steps until said third trim signal is substantially zero.

2. The method of claim 1 further including the step of limiting the magnitude of said third trim signal to prevent excessive temperature sin said engine, and to prevent flameout.

3. The method of claim 2 further including the step of presetting said second trim signal so that said third trim signal is initialized to zero.

4. The method of claim 1 wherein said step of measuring said actual fuel flow includes the step of correcting said measured flow for fuel temperature.

5. The method of claim 1 further comprising the step of switching said triming step on only during startup of said engine.

6. The method of claim 5 wherein said switching step includes the steps of:

measuring said engine's rotational speed and comparing said measured speed with a preselected speed;

receiving a signal indicating that the step of measuring said actual fuel flow is properly functioning; and comparing said scheduled fuel flow signal to a preselected maximum and minimum fuel flow.

7. The method of claim 6 further comprising the step of deciding that a startup is occuring when said measured rotational speed is below said preselected speed, said step of measuring is functioning, and said scheduled signal is increasing and is below said preselected maximum.

8. The method of claim 6 further comprising the step of deciding that a startup is occuring when said measured rotational speed is below said preselected speed, said step of measuring is functioning, and said scheduled signal is decreasing and is below said preselected minimum.

* * * * *